United States Patent
Lefebvre et al.

(10) Patent No.: US 11,268,573 B2
(45) Date of Patent: Mar. 8, 2022

(54) BEARING HOUSING OIL INTAKE TO SUPPLY DUAL BEARING STRUCTURE

(71) Applicant: PRATT & WHITNEY CANADA CORP., Longueuil (CA)

(72) Inventors: Guy Lefebvre, St-Bruno-de-Montarville (CA); Francois Doyon, Sainte-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 14 days.

(21) Appl. No.: 16/829,023

(22) Filed: Mar. 25, 2020

(65) Prior Publication Data

US 2021/0301875 A1  Sep. 30, 2021

(51) Int. Cl.
*F16C 33/66* (2006.01)
*F16C 19/54* (2006.01)
(Continued)

(52) U.S. Cl.
CPC .......... *F16C 33/6659* (2013.01); *F16C 19/54* (2013.01); *F16C 27/045* (2013.01);
(Continued)

(58) Field of Classification Search
CPC .......... F16C 19/54; F16C 19/24; F16C 19/26; F16C 19/28; F16C 37/007; F16C 35/077; F16C 33/6662; F16C 33/6659; F16C 33/6685; F16C 33/6681; F16C 2360/23; F16C 27/045; F01D 25/16; F01D 25/162; F01D 25/164; F01D 25/18
See application file for complete search history.

(56) References Cited

U.S. PATENT DOCUMENTS 3,011,840 A * 12/1961 Littleford ............ F01D 25/164
384/581
4,214,796 A * 7/1980 Monzel ................ F01D 25/164
384/202
(Continued)

FOREIGN PATENT DOCUMENTS

FR        1093768 A     5/1955
WO     2019058051 A1    3/2019

OTHER PUBLICATIONS

European Search Report issued in counterpart EP application No. 21164577.5 dated Sep. 1, 2021.

*Primary Examiner* — Alan B Waits
(74) *Attorney, Agent, or Firm* — Norton Rose Fulbright Canada LLP

(57) ABSTRACT

A bearing assembly comprises a first bearing axially spaced from a second bearing, each bearing having an inner race disposed on a shaft and having an outer race. The bearings are mounted to a mounting sleeve having an outer sleeve surface and an inner sleeve surface engaging the outer race of each bearing. The mounting sleeve has an outer surface engaged with an inner bearing support of a bearing housing having an enclosed chamber. A housing oil inlet is in fluid communication with the enclosed chamber. The mounting sleeve includes an axially extending sleeve oil passage in fluid communication with the housing oil inlet. The mounting sleeve has a first outlet in the vicinity of the first bearing and the sleeve oil passage has a second outlet in the vicinity of the second bearing.

16 Claims, 7 Drawing Sheets

(51) Int. Cl.
*F16C 37/00* (2006.01)
*F16C 35/07* (2006.01)
*F16C 27/04* (2006.01)
*F16C 35/077* (2006.01)

(52) U.S. Cl.
CPC ...... *F16C 33/6662* (2013.01); *F16C 33/6685* (2013.01); *F16C 35/077* (2013.01); *F16C 37/007* (2013.01)

(56) References Cited

U.S. PATENT DOCUMENTS

| | | |
|---|---|---|
| 4,789,253 A | 12/1988 | Perego |
| 5,388,917 A | 2/1995 | Hibi et al. |
| 6,872,003 B2 | 3/2005 | Dusserre-Telmon et al. |
| 7,648,277 B2 * | 1/2010 | Laurant ................ F16C 33/581 384/99 |
| 7,857,519 B2 * | 12/2010 | Kostka ................ F01D 25/164 384/535 |
| 8,136,999 B2 * | 3/2012 | Mons ................ F16C 27/04 384/581 |
| 9,702,404 B2 * | 7/2017 | Smedresman ......... F16C 23/08 |
| 9,932,899 B2 | 4/2018 | Kimura |
| 10,119,459 B2 | 11/2018 | Fraser |
| 2007/0157596 A1 * | 7/2007 | Moniz ................ F16C 33/6677 60/39.162 |
| 2011/0206498 A1 * | 8/2011 | McCooey ............ F16H 57/082 415/124.1 |

* cited by examiner

FIG. 6

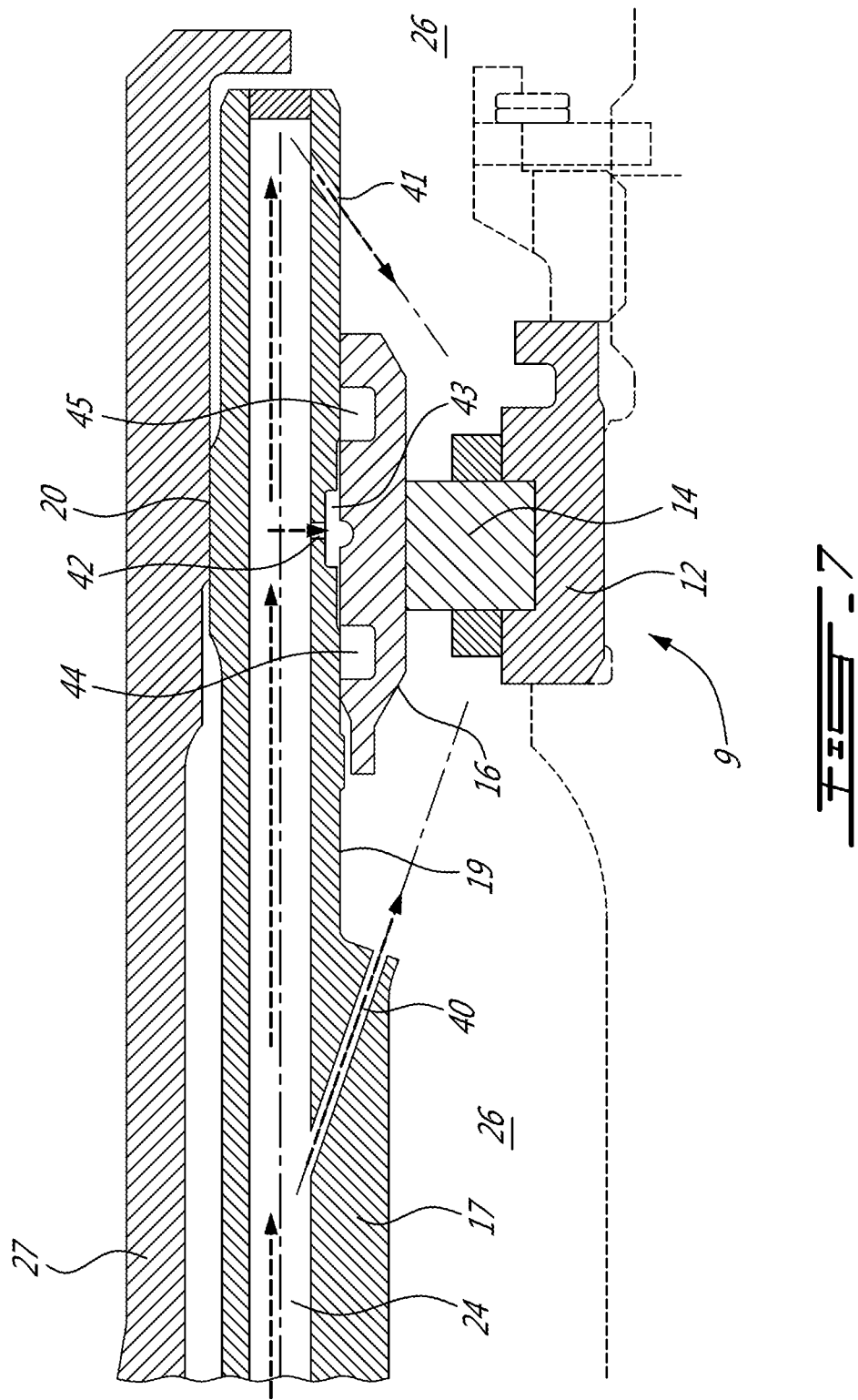

BEARING HOUSING OIL INTAKE TO SUPPLY DUAL BEARING STRUCTURE

TECHNICAL FIELD

The disclosure generally relates to bearings and, more particularly, to bearing lubrication.

BACKGROUND

Gas turbine engines have rotors including shafts rotatably mounted on bearings contained within bearing housings. Each bearing housing encloses bearings in a bearing cavity that receives oil via an oil supply conduit for cooling and lubricating the bearings. Oil is scavenged from the bearing housing and drawn through an oil pump, oil cooler and oil filter before recirculating to the bearing housing.

Providing adequate oil to multiple bearings is not a simple matter of supplying more volume of oil to the bearing housing. Excess oil represents a weight penalty, adequate distribution of oil within a confined space can be difficult, and residual oil that has been cooked or overheated on engine shutdown has a reduced service life. Improvement is thus desirable.

SUMMARY

The disclosure describes a bearing assembly for supporting a shaft rotating on an axis, the bearing assembly comprising: a first bearing axially spaced from a second bearing, each bearing having an inner race disposed on the shaft and having an outer race; a bearing mounting sleeve having an outer sleeve surface and having inner sleeve surface engaging the outer race of the first bearing and the second bearing; and a bearing housing having an enclosed chamber with an inner bearing support engaging the outer sleeve surface of the bearing mounting sleeve, and a housing oil inlet in fluid communication with the enclosed chamber; wherein the bearing mounting sleeve includes an axially extending sleeve oil passage in fluid communication with the housing oil inlet, the bearing mounting sleeve having a first outlet in the vicinity of the first bearing and the sleeve oil passage having a second outlet in the vicinity of the second bearing.

In a further aspect the disclosure describes a bearing mounting sleeve for supporting a shaft rotating on an axis, the shaft being rotatably supported by a forward bearing and a rearward bearing axially spaced from the forward bearing, the shaft being surrounded by a bearing housing having an enclosed chamber with an inner bearing support, a housing oil inlet being in fluid communication with the enclosed chamber, the bearing mounting sleeve comprising: an outer sleeve surface engageable with the inner bearing support of the bearing housing; an inner sleeve surface engageable with the forward bearing and the rearward bearing; a forward outlet in a vicinity of the forward bearing connectable in fluid communication with the housing oil inlet; and an axially extending sleeve oil passage connectable in fluid communication with the housing oil inlet, the axially extending sleeve oil passage having a rearward outlet in a vicinity of the rearward bearing.

In a further aspect the disclosure describes a method of providing oil to a dual bearing assembly comprising first and second bearings mounted within a bearing housing having an oil inlet in fluid communication with a chamber, the method comprising: assembling the first and second bearings in a bearing mounting sleeve; assembling the bearing mounting sleeve inside the bearing housing, fluidly connecting a sleeve oil passage extending through the bearing mounting sleeve to the oil inlet of the bearing housing; supplying oil to the first bearing via the oil inlet of the bearing housing to a first outlet in a vicinity of the first bearing; and supplying oil to the second bearing via the sleeve oil passage to a second outlet in a vicinity of the second bearing Further details of these and other aspects of the subject matter of this application will be apparent from the detailed description included below and the drawings.

DESCRIPTION OF THE DRAWINGS

FIG. 6 is a partial axial sectional view of the forward bearing.

FIG. 7 is a partial axial sectional view of the rearward bearing.

DETAILED DESCRIPTION

Figure 1:
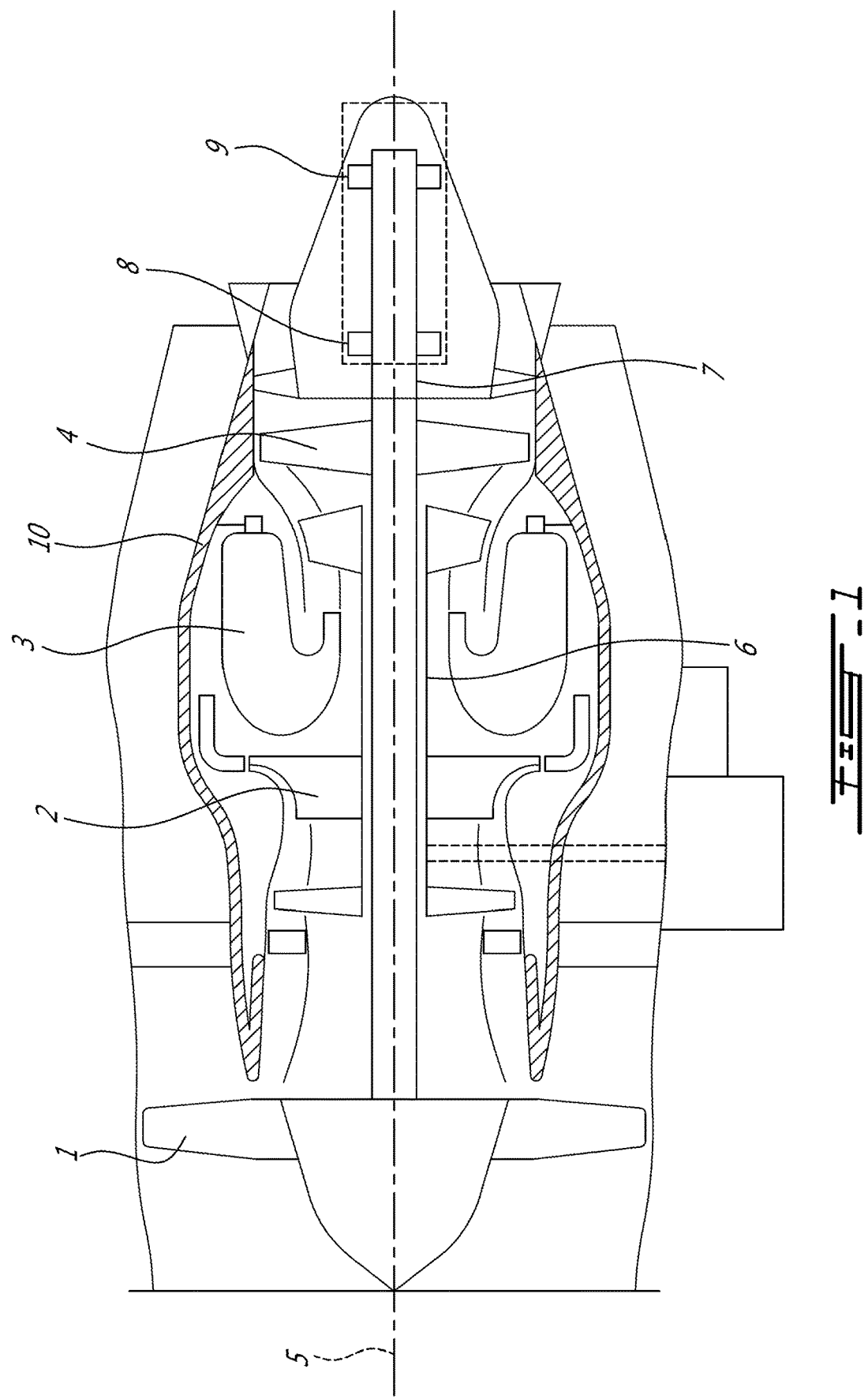
FIG. 1 shows an axial cross-section view of an example turbofan gas turbine engine, having low pressure shaft with a forward fan and a pair of bearing in a rearward bearing housing within the exhaust cone.

FIG. 1 shows an example gas turbine engine having in serial flow communication a fan 1 through which ambient air is propelled, a compressor section 2 for pressurizing the air, a combustor 3 in which the compressed air is mixed with fuel and ignited for generating an annular flow of hot combustion gases, and a turbine section 4 for extracting energy from the combustion gases. The fan 1, the compressor section 2 and the turbine section 4 are rotatable about a central rotation axis 5.

Figure 2:
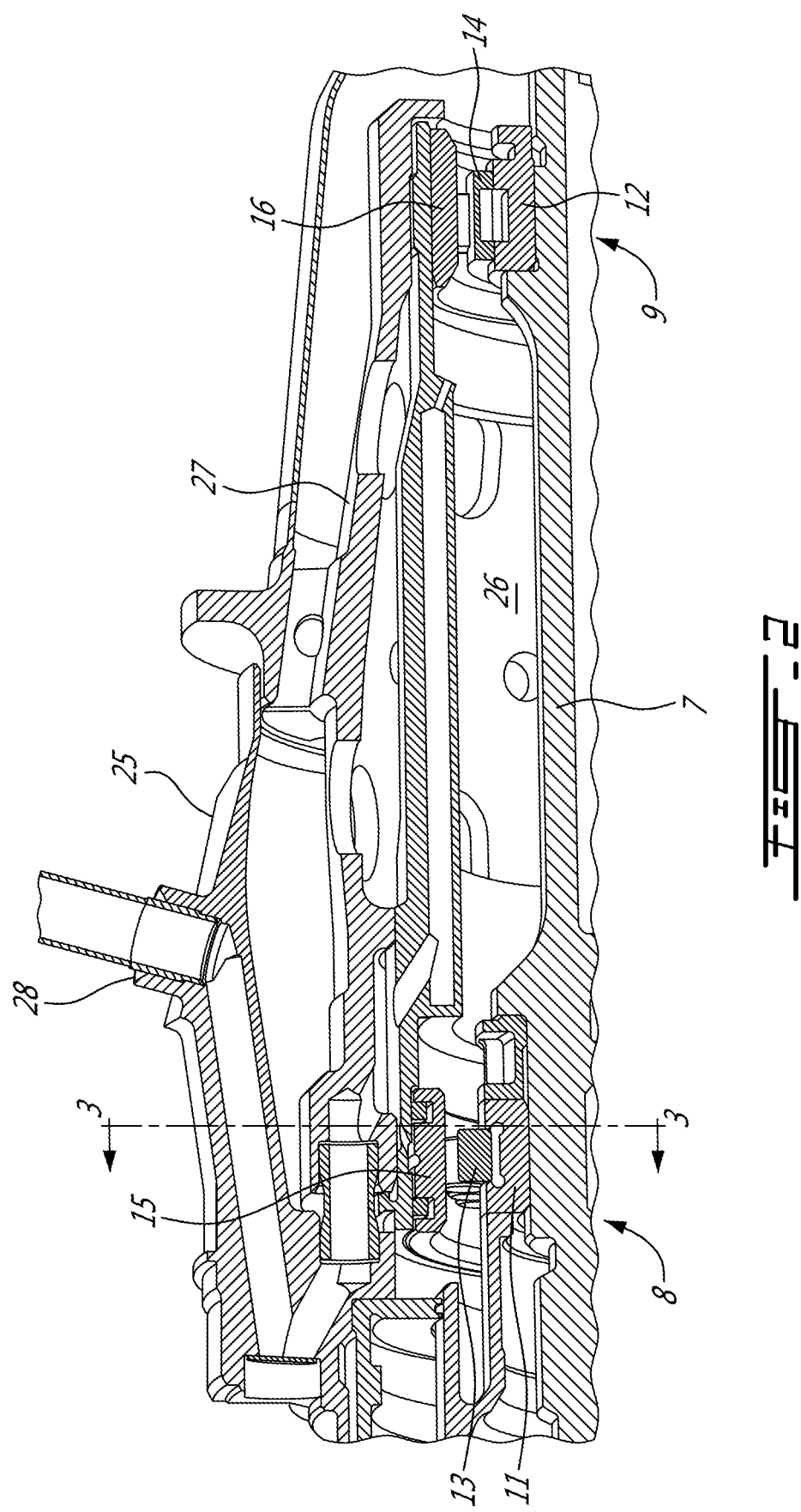
FIG. 2 is a partial axial cross-section view through the bearing housing, a bearing mounting sleeve, a forward bearing, a rearward bearing and the low pressure shaft, in accordance with the present description.

The fan 1, compressor section 2 and turbine section 4 have rotating components which can be mounted on multiple coaxial high pressure shaft 6 and low pressure shaft 7 that rotate concentrically around the central axis 5. FIGS. 1 and 2 show an axial sectional view of an exemplary bearing assembly for supporting the rear end of the low pressure shaft 7. The first or forward end of the low pressure shaft 7 is supported with other bearings (not shown) located aft of the fan 1. The illustrated example of the rear bearing assembly comprises axially spaced-apart bearings 8 and 9 (two in the illustrated example) housed in a bearing housing 25 disposed downstream of the turbine section 4. Struts (not shown) or the like may be provided to transfer loads from the bearing housing 25 to an outer engine casing 10.

Due to limited space and access, oil may be supplied to the bearing housing 25 of bearings 8, 9 via a single oil inlet and scavenged via a single oil outlet. When multiple axially spaced apart bearings are located within a bearing housing, ensuring adequate oil supply and oil circulation to each bearing from a single inlet may require multiple oil channels or conduits within the bearing housing which has limited space available.

On engine shutdown, any excess oil trapped within the bearing housing may be cooked or overheated, by convective ambient heat absorbed (i.e. soak back) by the bearing housing from the surrounding hot gas path components. Accordingly, providing adequate oil to multiple bearings may be challenging. Indeed, excess oil represents a weight penalty, adequate distribution of oil within a confined space can be difficult, and residual oil that has been cooked or overheated on engine shutdown has a reduced service life.

Figure 3:
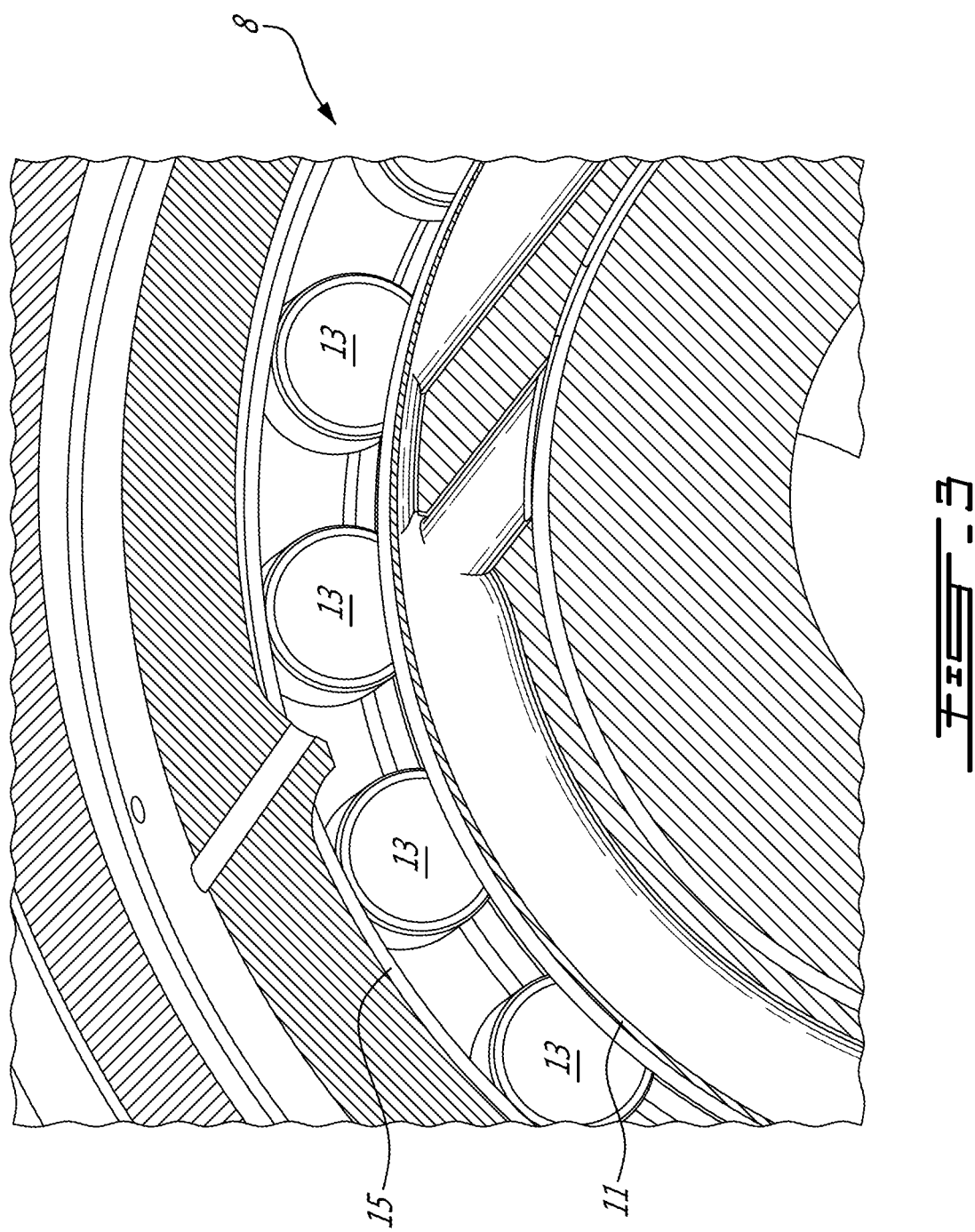
FIG. 3 is an axial view along line 3-3 of FIG. 2.
Figure 6:
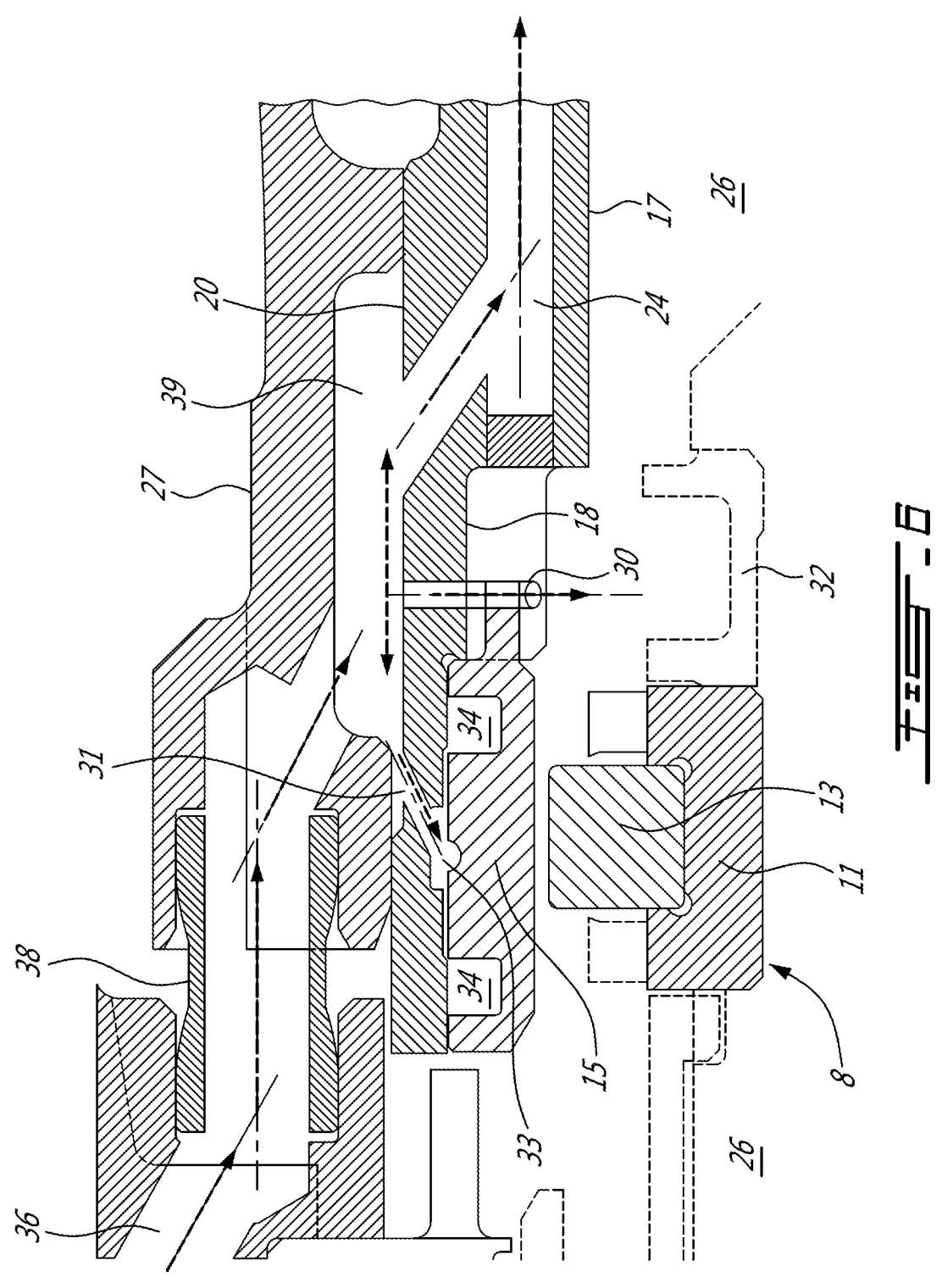

Referring to FIGS. 2, 6 to 7, the first or forward bearing 8 is axially spaced from the second or rearward bearing 9 on the low pressure shaft 7. Each bearing (forward bearing 8 and rearward bearing 9) has an inner race 11, 12 (respectively) disposed on the low pressure shaft 7 and an outer race 15, 16 (respectively). As seen in FIG. 3, a ring of bearing elements such as cylindrical rollers 13 engage the inner race 11 and the outer race 15 of the forward bearing 8 shown.

Figure 4:
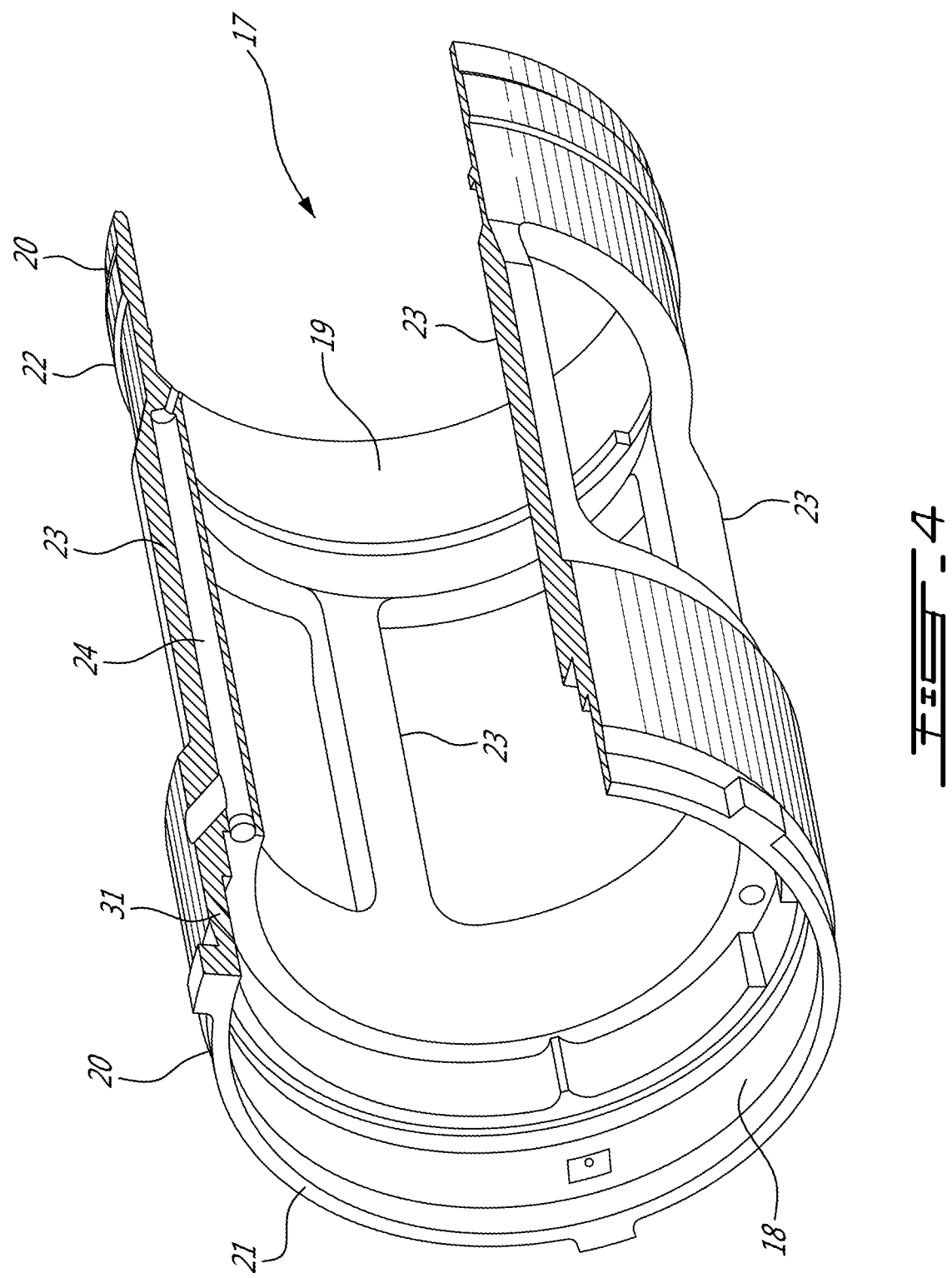
FIG. 4 is an isometric partial cutaway view of the bearing mounting sleeve comprising forward ring, rearward ring and four axial struts with interior oil passages.

Referring concurrently to FIGS. 4, 6-7, it can be seen that the exemplary bearing assembly further comprises a bearing mounting sleeve 17 having inner sleeve surfaces 18, 19 respectively engaging the outer race 15 of the forward bearing 8 and the outer race 16 of the rearward bearing 9. The bearing mounting sleeve 17 has an outer sleeve surface 20 best seen in FIG. 4. In the example shown in FIG. 4, the bearing mounting sleeve 17 is a generally cylindrical hollow tube. The bearing mounting sleeve 17 comprises a first or forward ring 21 and a second or rearward ring 22 joined together with a plurality of circumferentially spaced-apart axial struts 23. At least one strut 23 includes an axial sleeve oil passage 24. FIGS. 6-7 show the sleeve oil passage 24 and the supply of oil indicated with arrows.

Referring to FIGS. 2, 6-7, a bearing housing 25 surrounds an enclosed inner chamber 26 to contain the lubricating oil and support the bearings 8, 9. The bearing housing 25 includes an inner bearing support 27 that supports and engages the outer sleeve surface 20 of the bearing mounting sleeve 17. The bearing housing 25 has a housing oil inlet 28 (FIG. 2) in fluid communication with the enclosed inner chamber 26 of the bearing housing 25. The bearing housing 25 also has a housing oil drain (not shown) in a lower area. The engine oil circulating system (oil pump, oil filter, oil cooler) supplies pressurized oil to the housing oil inlet 28 and drains spent oil from the housing oil drain.

Figure 5:
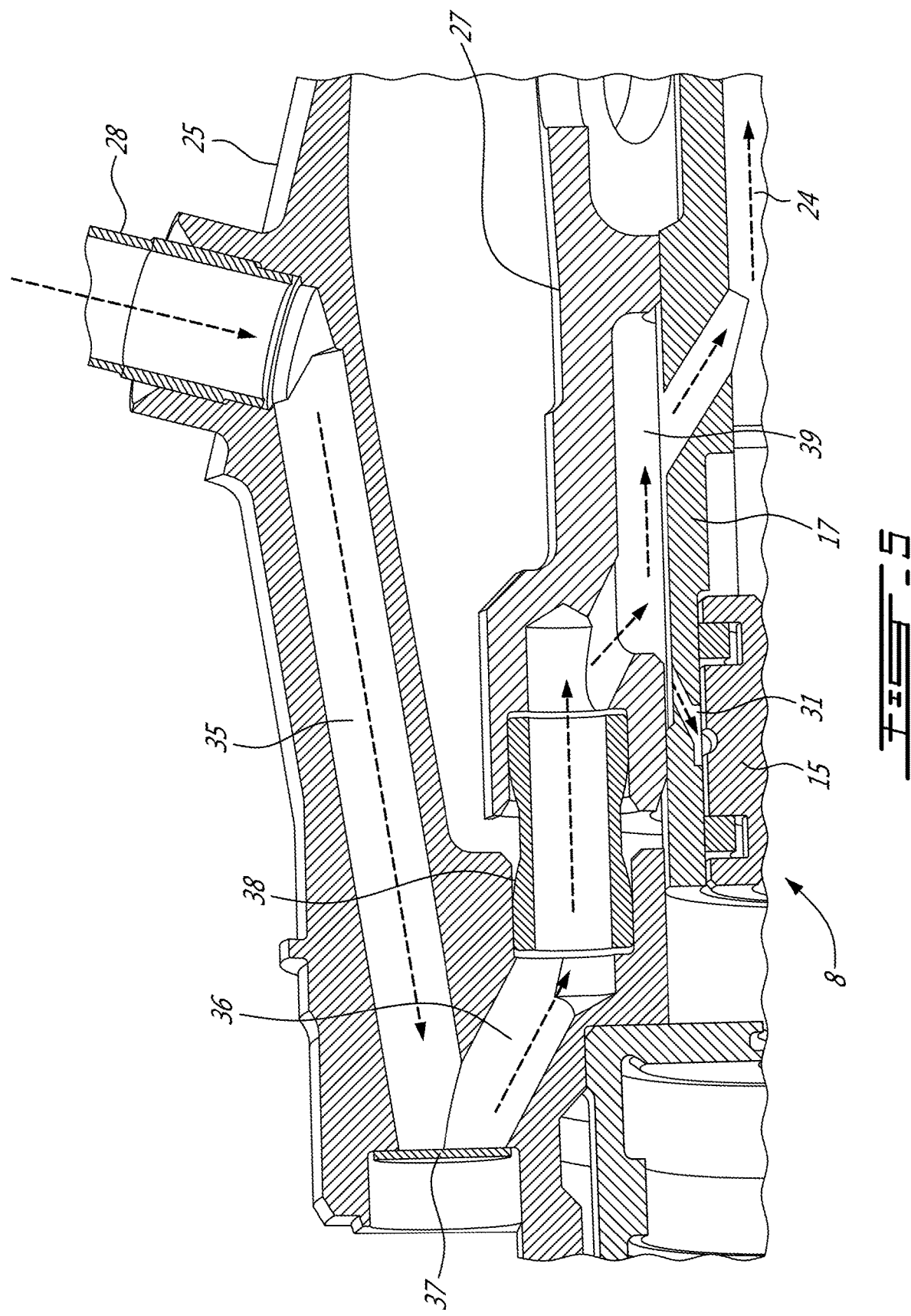
FIG. 5 is a partial axial sectional view of the bearing housing oil inlet.

FIGS. 5 and 6 show the housing oil inlet 28 and means by which oil is directed to the sleeve oil passage 24 of the bearing mounting sleeve 17. The inner bearing support 27 of the bearing housing 25 includes an oil distribution plenum 39 disposed between the housing oil inlet 28 and the forward oil outlets, namely a radially directed oil scoop nozzle 30 (FIG. 6) and an oil damper inlet 31, defined in the forward ring 21 of the bearing mounting sleeve 17. As best seen in FIG. 6, the radially directed oil scoop nozzle 30 sprays oil toward a rotating oil scoop 32 that flings oil within the bearing housing 25. The oil scoop 32 is provided on the shaft 7 adjacent bearing 8. The oil damper inlet 31 directs oil into an oil damper chamber 33 defined between axially spaced apart annular seals 34 engaging the outer race 15 of the forward bearing 8. The operation of the oil damper chamber 33 and seals 34 provide a radial dampening of bearing movement.

Referring to FIG. 5, when oil enters the housing oil inlet 28 of the bearing housing 25, the oil flows into a primary supply conduit 35 and a secondary supply conduit 36 that may be drilled into the bearing housing 25 and sealed with a plug weld 37. Since the inner bearing support 27 flexes and moves relative to the stationary outer portions of the bearing housing 25 (housing oil inlet and conduits 35, 36) a coupling conduit 38 provides flexibility between the inner bearing support 27 and the housing oil inlet 28. In the example illustrated (FIGS. 5-6), the coupling conduit 38 includes a short tube with external spherical seal end surfaces for connecting to sockets of the inner bearing support 27 and the secondary supply conduit 36 fed by the housing oil inlet 28. Downstream from the coupling conduit 38 is the oil distribution plenum 39. In the example shown, the oil distribution plenum 39 is defined between the inner bearing support 27 and the bearing mounting sleeve 17 as an annular recess fluidly connected to coupling conduit 38.

Referring to FIGS. 6-7, the oil flow from the oil distribution plenum 39 lubricates the forward bearing 8 via the radially directed oil scoop nozzle 30, pressurizes the oil filled oil damper chamber 33, and conveys oil toward the rearward bearing 9 via the sleeve oil passage 24 in the bearing mounting sleeve 17. Although not shown in FIG. 6, the oil distribution plenum 39 could also supply oil to a side nozzle directed radially and axially at an angle toward the forward bearing 8. Various oil circuitries are contemplated.

Referring to FIGS. 4, 6-7, the axially extending sleeve oil passage 24 in the bearing mounting sleeve 17 is in fluid communication with the housing oil inlet 28 (see FIG. 5) via plenum 39. The bearing mounting sleeve 17 has a first or forward outlet (e.g. the radially directed oil scoop nozzle 30 and the oil damper inlet 31) in the vicinity of the forward bearing 8 and the sleeve oil passage 24 has at least one second or rearward outlet in the vicinity of the rearward bearing 9.

Referring to the example of FIG. 7, the rearward outlet of the sleeve oil passage 24 shows three oil outlets. As described in relating to the forward outlet near the forward bearing 8, the rearward outlet could include a radially directed oil scoop nozzle, although that option is not shown in the illustrated embodiment. FIG. 7 shows three outlets namely: two side nozzles 40, 41 directed radially and axially toward the rearward bearing 9; and an oil damper inlet 42. The oil damper inlet 42 is directed into an oil damper chamber 43 defined between axially spaced apart annular seals 44, 45 engaging the outer race 16 of the rearward bearing 9. The sleeve oil passage 24 or multiple passages provide sufficient oil distribution to the rearward bearing 9 from a single housing oil inlet 28.

As seen in FIG. 6, the forward outlets 30, 31 receive oil flow from the oil distribution plenum 39 and the housing oil inlet 28 via the coupling conduit 38 and supply conduits 35, 36. The forward outlets 30, 31 could be arranged to receive oil from the sleeve oil passage 24 if desired, however the example illustrated supplies the radially directed oil scoop nozzle 30 and the oil damper inlet 31 directly from the oil distribution plenum 39.

The above described components provide a method of supplying oil to the forward bearing 8 and the rearward bearing 9 within the bearing housing 25 for supporting the low pressure shaft 7. The sequence of assembly is as follows.

The inner race 11 of the forward bearing 8 and the inner race 12 of the rearward bearing 9 are assembled on the low pressure shaft 7 with the rearward bearing 9 axially spaced from the forward bearing 8. The inner sleeve surfaces 18, 19 of the bearing mounting sleeve 17 are respectively assembled on the outer race 15 of the forward bearing 8 and on the outer race 16 the rearward bearing 9. The outer sleeve surface 20 of the bearing mounting sleeve 17 is assembled to the inner bearing support 27 of the bearing housing 25 within the enclosed chamber 26. The housing oil inlet 28 and the housing oil drain (not shown) of the bearing housing 25 are in fluid communication with the enclosed chamber 26 and in fluid communication with the engine oil circulating system. Oil is provided under pressure to the axially extending sleeve oil passage 24 of the bearing mounting sleeve 17 in fluid communication with the housing oil inlet 28. Oil is supplied to the forward bearing 8 to one of more forward outlets (30, 31) in the vicinity of the forward bearing 8 from the oil distribution plenum 39. Oil is supplied to the rearward bearing 9 via the sleeve oil passage 24 to at least one rearward outlet (40, 41, 42) in the vicinity of the rearward bearing 9.

According to some embodiments, there is provided a bearing housing having a dual bearing mounting sleeve that has integrated oil distribution channels distributing lubricating oil from a single oil inlet to dual bearings.

According to some embodiment, the bearing mounting sleeve 17 with integral lubrication passages 24 allows all bearings (8, 9) to be supplied with oil from a single inlet 28 using a single compact element (mounting sleeve 17). The axial lubrication passages 24 can be tapped into at various locations and orientations to provide outlets (33, 42) or oil jets (30, 40, 41) at any angle or axial position desired. Oil jets can be oriented at side surfaces of the bearings, can be oriented radially toward oil scoops or can inject oil into sealed oil dampers surrounding the outer race of the bearings. The use of a bearing mounting sleeve 17 allows for preassembly of the outer races of multiple bearings 8, 9 in a sleeve 17 that is inserted together into the bearing support 27. Oil cooking due to soak back or heat convection can be reduced since the oil is conveyed through integral lubrication passages 24 in the internal bearing mounting sleeve 17 rather than in the external bearing housing 25 itself. A more compact and less costly oil distribution system within the bearing housing 25 can be provided to multiple bearings 8,9 accordingly.

The embodiments described in this document provide non-limiting examples of possible implementations of the present technology. Upon review of the present disclosure, a person of ordinary skill in the art will recognize that changes may be made to the embodiments described herein without departing from the scope of the present technology. For instance, while the bearing assembly has been exemplified as a rear bearing assembly of a low pressure shaft, it is understood that it could be applied to other bearing assemblies of other components. Yet further modifications could be implemented by a person of ordinary skill in the art in view of the present disclosure, which modifications would be within the scope of the present technology.

What is claimed is:

1. A bearing assembly for supporting a shaft rotating on an axis, the bearing assembly comprising:
    a first bearing axially spaced from a second bearing, each bearing having an inner race and an outer race;
    a bearing mounting sleeve having an outer sleeve surface and having inner sleeve surface, the inner sleeve surface engaging the outer race of the first bearing and the second bearing; and
    a bearing housing having an enclosed chamber with an inner bearing support engaging the outer sleeve surface of the bearing mounting sleeve, and a housing oil inlet in fluid communication with the enclosed chamber;
    wherein the bearing mounting sleeve includes an axially extending sleeve oil passage in fluid communication with the housing oil inlet, the bearing mounting sleeve having a first outlet in the vicinity of the first bearing and the sleeve oil passage having a second outlet in the vicinity of the second bearing, and
    wherein the bearing housing includes an oil distribution plenum defined in an annulus radially between the inner bearing support and the bearing mounting sleeve.

2. The bearing assembly according to claim 1 wherein the bearing mounting sleeve comprises a first ring and a second ring joined together with a plurality of axial struts, and wherein the sleeve oil passage is disposed within at least one of the plurality of axial struts.

3. The bearing assembly according to claim 1 wherein the second outlet of the sleeve oil passage comprises at least one of:
    a radially directed oil scoop nozzle;
    a side nozzle directed radially and axially toward the second bearing; and
    an oil damper inlet directed into an oil damper chamber defined between axially spaced apart annular seals engaging the outer race of the second bearing.

4. The bearing assembly according to claim 1 wherein the first outlet of the bearing mounting sleeve comprises at least one of:
    a radially directed oil scoop nozzle;
    a side nozzle directed radially and axially toward the first bearing; and
    an oil damper inlet directed into an oil damper chamber defined between axially spaced apart annular seals engaging the outer race of the first bearing.

5. The bearing assembly according to claim 1 wherein the distribution plenum is disposed upstream of the axially extending sleeve oil passage.

6. The bearing assembly according to claim 5 wherein the oil distribution plenum comprises an annular recess.

7. The bearing assembly according to claim 1, comprising:
    a coupling conduit between the inner bearing support and the housing oil inlet.

8. The bearing assembly according to claim 7 wherein the coupling conduit has external spherical seal end surfaces for connecting to sockets of the inner bearing support and the housing oil inlet.

9. A bearing assembly for supporting a shaft rotating on an axis, the bearing assembly comprising:
    a forward bearing and a rearward bearing axially spaced from the forward bearing;
    a bearing housing having an enclosed chamber with an inner bearing support, a housing oil inlet being in fluid communication with the enclosed chamber;
    a coupling conduit between the inner bearing support and the housing oil inlet; and
    a bearing mounting sleeve comprising:
        an outer sleeve surface engageable with the inner bearing support of the bearing housing;
        an inner sleeve surface engageable with the forward bearing and the rearward bearing;
        a forward outlet in a vicinity of the forward bearing connectable in fluid communication with the housing oil inlet; and
        an axially extending sleeve oil passage connectable in fluid communication with the housing oil inlet, the axially extending sleeve oil passage having a rearward outlet in a vicinity of the rearward bearing, and
        wherein the bearing housing includes an oil distribution plenum disposed between the housing oil inlet and the axially extending sleeve oil passage.

10. The bearing assembly according to claim 9 comprising a forward ring and a rearward ring joined together with a plurality of axial struts, and wherein the sleeve oil passage extends axially through at least one strut of the plurality of axial struts.

11. The bearing assembly according to claim 9 wherein the rearward outlet comprises at least one of:
   a radially directed oil scoop nozzle;
   a side nozzle directed radially and axially toward the rearward bearing; and
   an oil damper inlet directed into an oil damper chamber defined between axially spaced apart annular seals engaging an outer race of the rearward bearing.

12. The bearing assembly according to claim 9 wherein the forward outlet comprises at least one of:
   a radially directed oil scoop nozzle;
   a side nozzle directed radially and axially toward the forward bearing; and
   an oil damper inlet directed into an oil damper chamber defined between axially spaced apart annular seals engaging an outer race of the forward bearing.

13. The bearing assembly of claim 9, wherein the oil distribution plenum includes and annular recess formed radially between the inner bearing support and the bearing mounting sleeve.

14. A method of providing oil to a dual bearing assembly comprising first and second bearings mounted within a bearing housing having an oil inlet in fluid communication with a chamber, the method comprising:
   assembling the first and second bearings in a bearing mounting sleeve;
   assembling the bearing mounting sleeve inside a dual bearing support of the bearing housing,
   fluidly connecting a sleeve oil passage extending through the bearing mounting sleeve to the oil inlet of the bearing housing, including fluidly connecting the oil inlet to an oil distribution plenum via a separate coupling conduit, the oil distribution plenum defined radially between the bearing mounting sleeve and the dual bearing support;
   supplying oil to the first bearing via the oil inlet of the bearing housing to a first outlet in a vicinity of the first bearing; and
   supplying oil to the second bearing via the sleeve oil passage to a second outlet in a vicinity of the second bearing.

15. The method according to claim 14 wherein supplying oil to the second bearing comprises at least one of supplying oil via:
   a radially directed oil scoop nozzle;
   a side nozzle directed radially and axially toward the second bearing; and
   an oil damper inlet directed into an oil damper chamber defined between axially spaced apart annular seals engaging an outer race of the second bearing.

16. The method according to claim 14 wherein supplying oil to the first bearing comprises at least one of supplying oil via:
   a radially directed oil scoop nozzle;
   a side nozzle directed radially and axially toward the first bearing; and
   an oil damper inlet directed into an oil damper chamber defined between axially spaced apart annular seals engaging an outer race of the first bearing.

* * * * *